A. ANDERSON.
CYLINDER TOOTH SECURING MEANS.
APPLICATION FILED JUNE 19, 1913.
1,095,951.
Patented May 5, 1914.
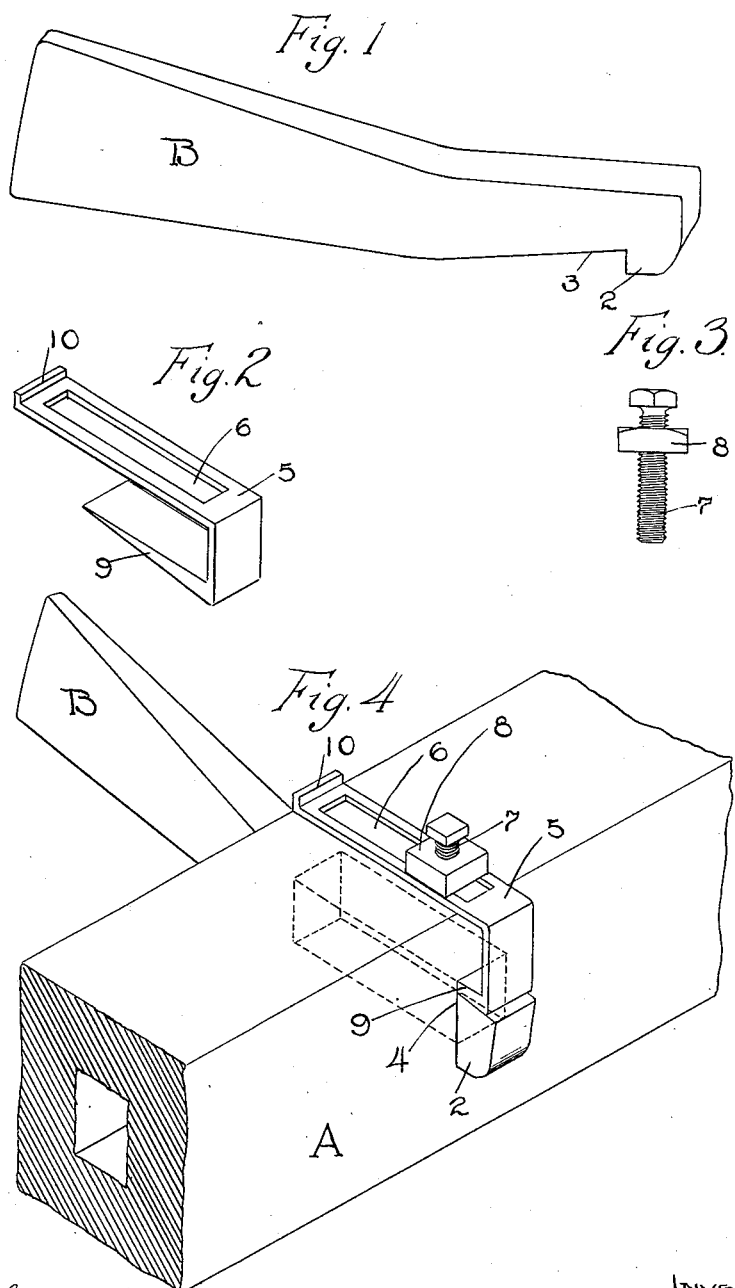
INVENTOR
August Anderson
his Attorneys

UNITED STATES PATENT OFFICE.

AUGUST ANDERSON, OF ST. PAUL, MINNESOTA, ASSIGNOR, BY DIRECT AND MESNE ASSIGNMENTS, TO NATIONAL AUTOMATIC CONCAVES AND TOOTH COMPANY, OF ST. PAUL, MINNESOTA, A CORPORATION OF MINNESOTA.

CYLINDER-TOOTH-SECURING MEANS.

1,095,951.   Specification of Letters Patent.   Patented May 5, 1914.

Application filed June 19, 1913. Serial No. 774,538.

*To all whom it may concern:*

Be it known that I, AUGUST ANDERSON, a citizen of the United States, residing at St. Paul, in the county of Ramsey and State of Minnesota, have invented certain new and useful Improvements in Cylinder - Tooth-Securing Means, of which the following is a specification.

My invention relates to improvements in connection with teeth for separator cylinders and the like, its object being particularly to provide means for removably supporting the teeth of the cylinder permitting easy and quick removal of the teeth.

To this end the invention consists in the features of construction, combination, and arrangement of parts hereinafter described and claimed.

In the accompanying drawings forming part of this specification, Figure 1 is an elevation of my improved tooth; Fig. 2 is a detail view of a coöperating fastening wedge forming part of my invention; Fig. 3 is a detail view of a supporting screw and securing nut for the wedge shown in Fig. 2; and Fig. 4 is an isometric view of a portion of a cylinder showing my improved tooth and fastening means supported in connection therewith.

Referring to the drawings, A indicates a portion of one of the metal longitudinal bars of the ordinary cylinder of the separator, etc. The bar, as shown, is of the hollow metal type. The cylinder with which my improved teeth are used may be of any well known construction and is therefore not specifically shown.

B represents my improved cylinder tooth of usual shape at its outer end but at its inner or shank end being square and formed with a flange or rib 2 extending downwardly below the adjacent bottom edge 3 of the tooth. The inner ribbed end of the tooth is adapted to be passed through a corresponding opening 4 in the cylinder bar A, as shown. With the cylinder tooth in position within the opening 4, the shank of the tooth is held forced down to bring the rib 2 below the lower edge of the opening by means of the locking device 5. The locking device 5 is, as shown, U-shaped, its upper side lying across the top face of the cylinder bar and formed with a longitudinally extending slot 6 through which a screw 7 extends into the bar. The locking device is secured in adjusted positions upon the cylinder bar by means of a lock nut 8 threaded upon the screw 7 whereby it may be carried into locking engagement with the fastening device. The lower side 9 of the fastening device is tapered inwardly toward its free edge to constitute a wedge. For use in releasing the wedge I form the upper side at its outer end with an upwardly extending flange or rib 10.

In use the teeth are locked in the cylinder bars, as illustrated in Fig. 4; the shank end of each tooth being passed through a corresponding opening 4 and the fastening device being forced outward to bring the wedge end between the shank of the tooth and the adjacent wall of the opening 4 to carry the flange 2 into locking engagement with the inner face of the bar. The fastening device is then locked in position by the screwing downward of the lock nut 8 upon the screw 7. When it is desired to loosen the tooth it is only necessary to loosen the lock nut 8 and then force back the fastening device by a blow against the flanged end 10 of the device, allowing removal of the tooth. I thus secure a tooth which is very easily inserted and removed and in which the fastening device is particularly accessible. The locking means, as will be evident, also forms a particularly positive lock for the tooth.

I am enabled by the use of my invention to far more easily and quickly remove the tooth than with the ordinary less easily accessible fastening means.

I claim as my invention:

1. In combination with a tooth supporting portion, of a cylinder formed with a tooth receiving opening, a tooth fitted in said opening and formed at its shank end with an offset portion, a locking device consisting of a slidable wedge portion holding said tooth in engagement with the cylinder portion and a portion connecting with said wedge portion extending upwardly and outwardly over the cylinder portion for the purpose set forth.

2. In combination with a tooth supporting portion, of a cylinder formed with tooth receiving openings, teeth fitted to said openings formed with projecting portions at their inner ends, a U-shaped locking device for each tooth consisting of a tapered portion slidably fitted in the tooth opening alongside the tooth, the opposed portion of said locking device extending over said cylinder portion for the purpose set forth.

3. In combination with a tooth supporting portion, of a cylinder formed with tooth receiving openings, teeth fitted to said openings formed with projecting portions at their inner ends, a U-shaped locking device for each tooth consisting of a tapered portion slidably fitted in the tooth opening alongside the tooth, the opposed portion of said locking device extending over said cylinder portion and being formed with a longitudinal slot and a screw supported locking nut arranged in coöperative relation with the slotted portion of said locking device.

In testimony whereof I affix my signature in presence of two witnesses.

AUGUST ANDERSON.

Witnesses:
H. S. JOHNSON,
H. SWANSON.

---

Copies of this patent may be obtained for five cents each, by addressing the "Commissioner of Patents, Washington, D. C."